(12) United States Patent
Zloter et al.

(10) Patent No.: US 7,839,394 B2
(45) Date of Patent: Nov. 23, 2010

(54) ELECTRONIC PEN DEVICE

(75) Inventors: Isaac Zloter, Holon (IL); Boris Gluzman, Petah Tiqwa (IL); Gideon Shenholz, Tel Aviv (IL)

(73) Assignee: Pegasus Technologies Ltd., Azoor (IL)

( * ) Notice: Subject to any disclaimer, the term of this patent is extended or adjusted under 35 U.S.C. 154(b) by 144 days.

(21) Appl. No.: 11/620,739

(22) Filed: Jan. 8, 2007

(65) Prior Publication Data

US 2008/0165162 A1    Jul. 10, 2008

(51) Int. Cl.
   *G06F 3/043*    (2006.01)
   *G06F 3/033*    (2006.01)
(52) U.S. Cl. ............... 345/179; 178/19.01; 178/19.02; 345/177
(58) Field of Classification Search ......... 345/177, 345/179; 178/19.01, 19.02
   See application file for complete search history.

(56) References Cited

U.S. PATENT DOCUMENTS

| | | | |
|---|---|---|---|
| 5,198,623 A | 3/1993 | Landmeier | |
| 6,104,388 A | 8/2000 | Nagai et al. | |
| 6,841,742 B2 * | 1/2005 | Shenholz et al. | ......... 178/18.04 |
| 6,876,356 B2 | 4/2005 | Zloter et al. | |
| 7,230,612 B2 | 6/2007 | Sano et al. | |
| 7,292,227 B2 | 6/2007 | Fukumoto et al. | |
| 7,242,395 B2 | 7/2007 | Kurashima et al. | |
| 7,324,096 B2 | 1/2008 | Nakazawa et al. | |
| 7,336,262 B2 | 2/2008 | Tsuji | |
| 7,342,350 B2 * | 3/2008 | Toda | ............... 310/334 |
| 2004/0114035 A1 | 6/2004 | White | |
| 2008/0143693 A1 | 6/2008 | Schena | |

FOREIGN PATENT DOCUMENTS

JP    11085378    4/1989

* cited by examiner

*Primary Examiner*—Amare Mengistu
*Assistant Examiner*—Randal Willis
(74) *Attorney, Agent, or Firm*—Mark M. Friedman

(57) ABSTRACT

Various electronic pen devices are disclosed herein. In one embodiment, an electronic pen with an improved ultrasound transducer (i.e. transmitter or receiver) is provided. In one embodiment an electronic pen with an improved 'pen up/pen down' detector is provided In one embodiment, an electronic pen with an improved structure for transmitting infrared light is provided. In one embodiment, an improved electronic pen that may be operated in pen mode or mouse mode is provided.

18 Claims, 17 Drawing Sheets

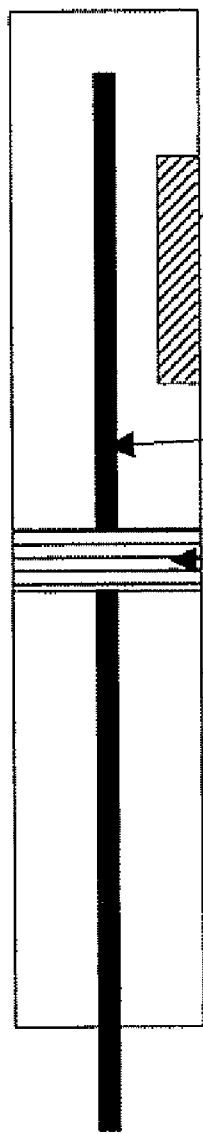
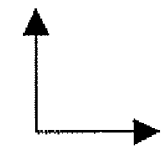
*Fig 2*
(PRIOR ART)

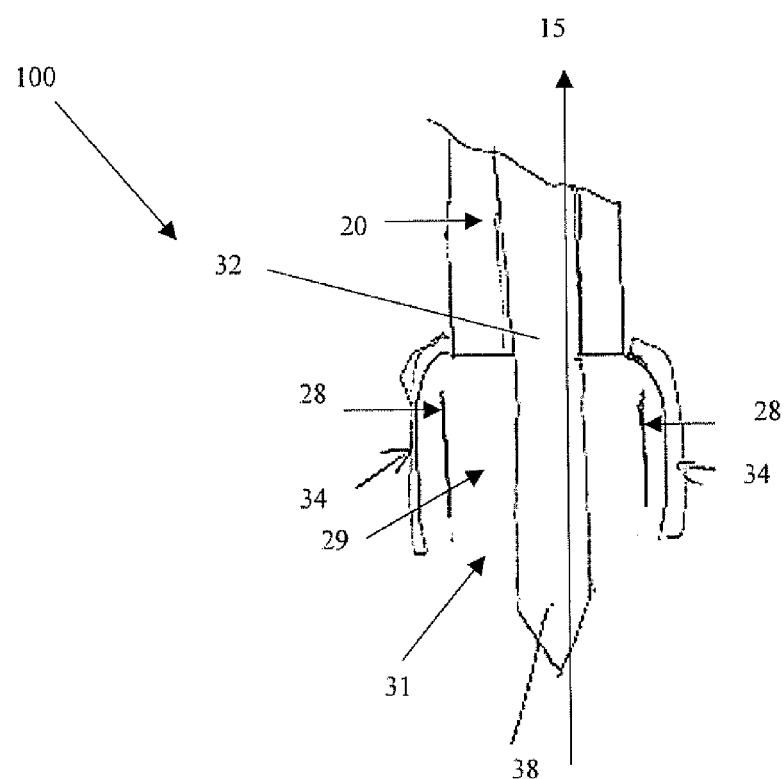
Fig 9
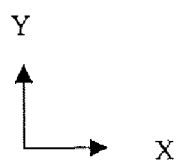

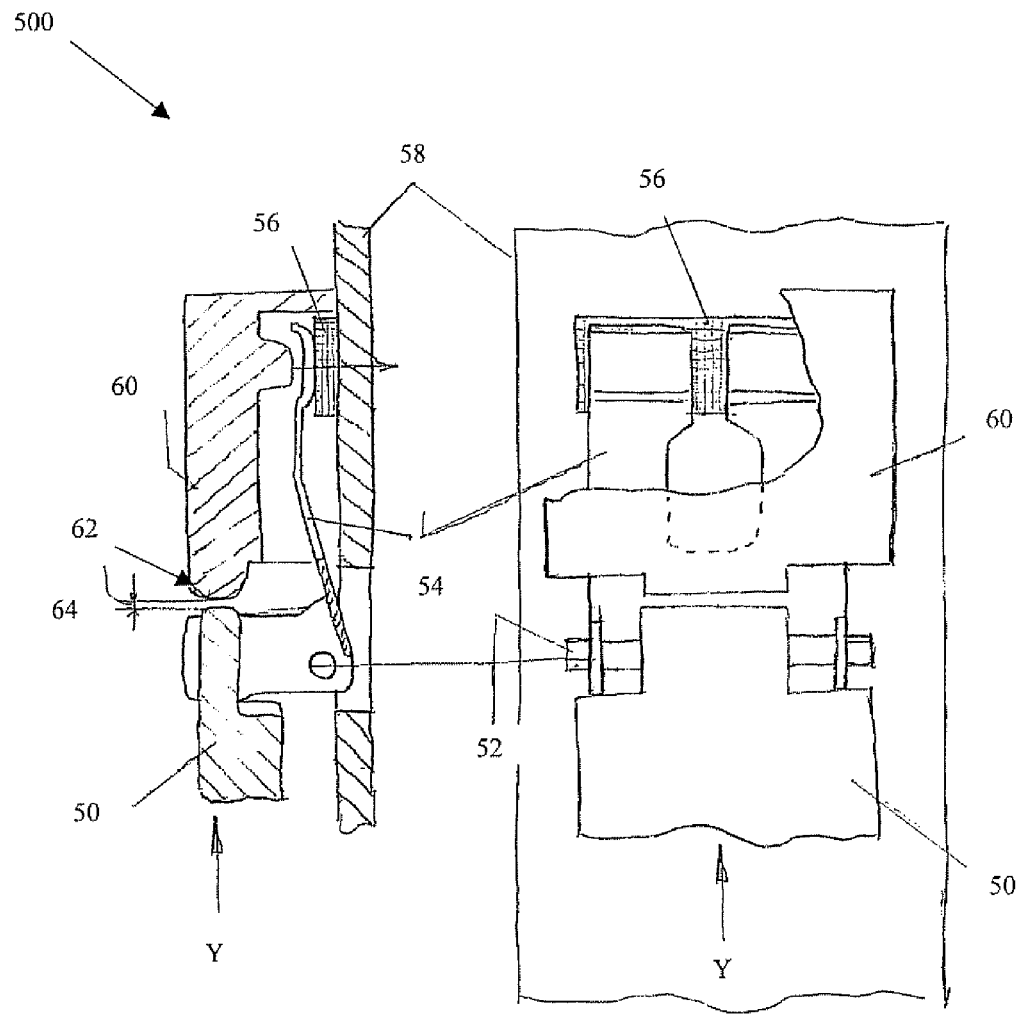
*Fig 12A*     *Fig 12B*

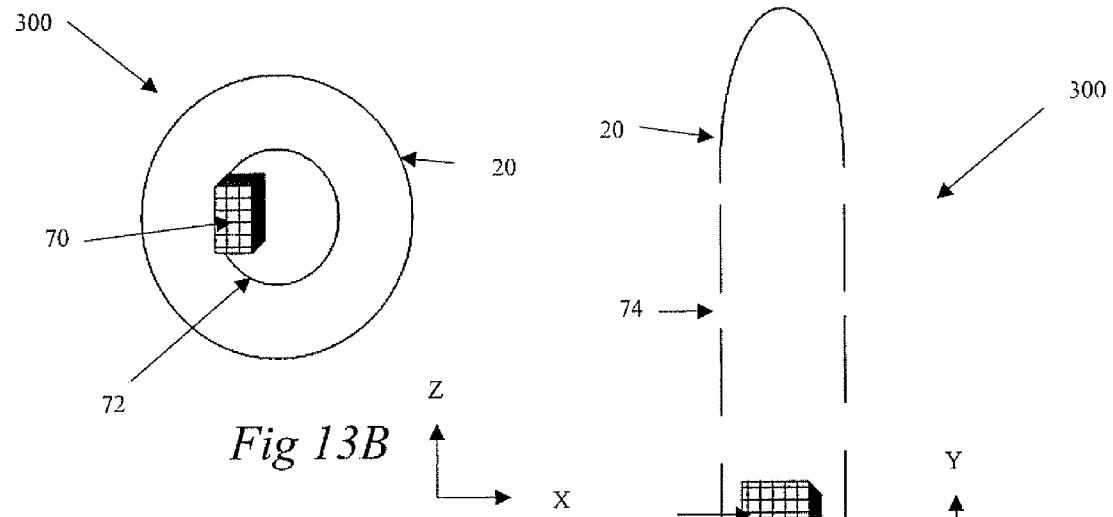
*Fig 13B*
*Fig 13C*
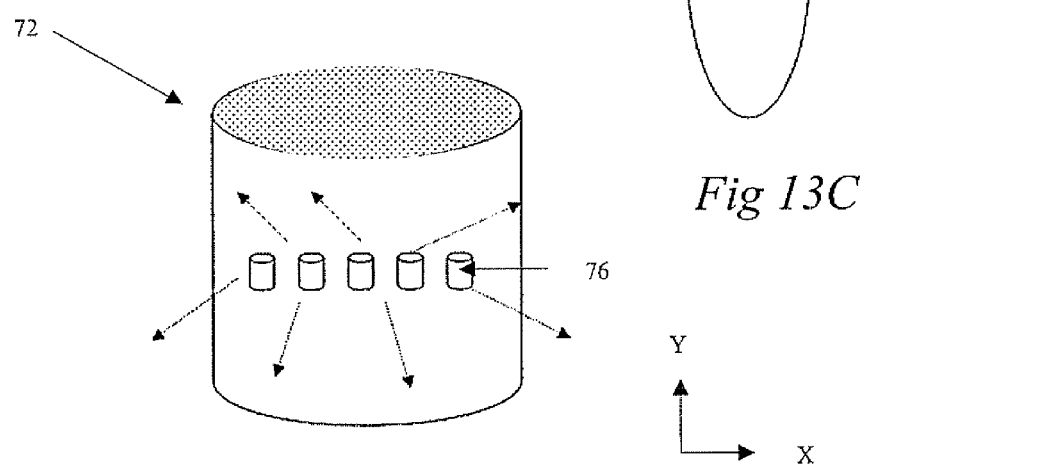
*Fig 13D*

ELECTRONIC PEN DEVICE

FIELD OF THE INVENTION

The present invention relates to improved electronic pen devices, for example, electronic pen devices for use in a system operative to determine the pen's location while digitizing the written data, using ultrasound and/or infrared signals.

BACKGROUND AND RELATED ART

By way of introduction, a digitizer system for tracking an electronic pen enables hand written documents and drawings to be tracked and stored electronically. The writing movements produced by these devices are traced and recorded, and as a result the textual and graphical content can be digitized and stored in memory and/or persistent storage. Some digital writing systems include optical character recognition (OCR) software for converting recorded pen strokes to text data. The term 'electronic pen' refers to pen with ink or to an inkless stylus. Digital writing instruments or styluses, interchangeably referred to herein as "digital pens" regardless of whether or not they write in ink, can be used to capture pen strokes and digitize them. The electronic pen communicates with a base unit of the digitizer system using a communications method that typically includes at least one of infrared signals, ultrasound signals and other communications method. The base unit also communicates with an external device such as a personal digital assistant (PDA) to record the movements of the electronic pen or stylus.

Various sensors detect and digitize the location of the pen, such that the writings, drawings or scribbles of the pen are stored, for example, into a computer file. The location of the digitizer pen is tracked with a device tracking mechanism. Those devices typically employ a combination of transmitters, especially ultrasound and infrared transmitters, and receivers for processing signals. The position of the movable implement is then derived by triangulation. These systems typically may require additional hard-wired or electromagnetic link, such as an infrared link, between the movable implement and a base unit whose position is fixed in space, to provide timing information for time-of-flight ultrasound calculations.

It is noted that digital writing systems have been described in several patent documents, including U.S. Pat. Nos. 6,876, 356, 5,198,623, JP. Pat. No. 11,085,378 and U.S. Pat. No. 6,104,388 (incorporated herein by reference).

It is thus noted that digital pens may include one or more of the following elements: (i) a sound transducer (for example, a sound transmitter and/or receiver, for example, including piezoelectric film), (ii) a 'pen-up/pen-down' sensor for sensing if the digital pen is in contact with a writing surface (or pressed to the writing surface), and (iii) an optical transmitter and/or optical receiver (for example, infrared transmitter and/or receiver).

A brief discussion of certain implementations of each of the aforementioned elements is provided below. Furthermore, it is noted that certain digital pens may also be used as mouse devices, and a brief discussion of certain issues related to using a digital pen also as a mouse device is also provided below.

Digital Pens that Include Sound Transmitters

FIG. 1 shows a distal portion of a digitizer pen, for example a digitizer pen disclosed in U.S. Pat. No. 6,876,356 of the present inventors, showing the digitizer pen designed as a cylindrical housing 10 having a central longitudinal axis 15, including a rigid writing implement 12 disposed along axis 15; and at its lower end, a narrower region 11 surrounded by a piezoelectric film 14 for transmitting sound signals Furthermore, the pen device includes an optical transmitter (or optical receiver) for providing synchronization information. Ultrasound transmitter is formed as a substantially cylindrical piezoelectric transmitter element attached to the lower end of housing 10. When piezoelectric transmitter element resonates, it produces an output sound wave which propagates perpendicularly to axis 15, as illustrated in FIG. 1.

Unfortunately, because of the propagation of the signals perpendicularly to the pen longitudinal axis, a significant attenuation of the detected signal is detected by the receivers. Interfering noise, created around the ultrasound transmitter, decreases the signal to noise ratio in the detected signal, decreasing accuracy and resolution. Therefore there is an ongoing need for electronic pen systems that facilitate more accurate determinations of pen position.

Digital Pens that Detected 'Pen Up and/or Pen Down' and/or Pressing of the Digital Pen to a Writing Surface Moreover, in many applications, the pen or stylus (i.e. having a point) is used by the user to 'write' or perform strokes on a given surface. Thus, when the stylus or pen is "down" (i.e. contacting the surface), the location of the pen at any given moment may be tracked in order to perform pen strokes. When the pen is "up" (i.e. hovering over the surface) the location of the pen may be tracked in order to provide the "mouse mode," or, alternatively, can be in "idle" status. Therefore an additional system is also required in order to determine when the user is writing and when the user is just moving the pen (i.e. to determine 'pen-up' or 'pen down'). Various systems are used to identify when the movable element is in contact with the writing surface and to determine when the user is writing as well as the fineness or thickness of a line being drawn.

In certain devices, for example as disclosed in U.S. Pat. No. 6,104,388 to Katsuharu et al., contact and pressure detectors are usually incorporated in the digitizer pen as a self-contained element including electronic circuitry.

Thus, as shown in FIG. 2, a sensor 16 (life for detecting a longitudinal force on elongated rod 13) is provided separately from printed circuit board PCS 18 which hosts electronics for operating an ultrasound transducer and/or an optical transmitter or receiver useful for sending or receiving signals for determining pen location. Unfortunately, this configuration (i.e. where sensor 16 is provided separately from PCT 18) might, in some situations, increase the manufacturing cost of the pen and/or make the pen less effective or convenient to use.

Digital Pens that Include Optical Transmitters

Digitizer pens frequently include an infrared transmitter. The IR signal may provide synchronization information, and may also provide additional information—for example, writing color information. Conventionally, infrared light sources are implemented at the distal end of a digitizer pen for directing infrared radiation emitted thereby through the pen housing as illustrated in FIG. 3. Because of the cylindrical shape of the housing, the infrared interface must have 360 degrees angular communications range around the pen longitudinal axis, to transmit an accurate signal. Typically, a plurality of infrared light sources (17), such as light-emitting diode (LED), reside 'externally' on a surface of the pen housing 19 and are located at various locations around housing 19 to obtain a good uniformity of the light transmission over the 360 degrees angular communications range around the pen longitudinal axis. Unfortunately, the need for multiple LEDs makes the device more expensive to manufacture, and it would be desirable to have a digital pen that requires fewer LEDs and/or provides light transmission of multiple beams of light per LED.

A Brief Discussion Related to Using a Digital Pen as a Computer Mouse

Certain digital writing systems provide two modes of operations—"digital pen mode" for tracking pen strokes, and a "mouse mode" where translation of the digital pen serves to provide movement of a "mouse locator" within the host system. The term "mouse" refers hereinafter to any device that a computer user pushes across a surface, such as a mouse pad or desk surface, in order to point to a place on a display screen of a computing device and/or to select one or more actions to take from that position. Towards this end, digital pens associated with these systems typically include a button deployed to the housing of the digital pen for providing "mouse clicks" on the host device. There are a number of applications for these such multifunctional systems. According to one specific example, a user may read certain electronic material (for example, by surfing the internet) and write notes upon finding items of interest. These notes may be saved electronically and refereed to a later time. There is an ongoing need for improved electronic pen system where the electronic pen provides both 'pen mode' and 'mouse mode.' In particular, there is an ongoing need for improved mechanisms for switching between pen mode and mouse mode and there is an ongoing need for improved 'writing' or 'linked' electronic pen devices that provide both pen mode and mouse mode.

SUMMARY OF THE INVENTION

It is thus one aspect of the present invention to provide an efficient electronic pen device including (a) an elongated housing including an elongated inner cavity, the housing further including a radial bore located at the distal end of the housing; and (b) an ultrasonic transmitter or receiver including a piezoelectric film deployed on the housing such that at least a portion of the piezoelectric film overlays at least one the radial bore.

According to another aspect of the present invention the housing is structured such that the inner cavity includes a first narrow portion whose average radius is a first value and a second wider portion whose average radius is a second value.

According to yet another aspect of the present invention the pen is configured so that a majority of sound energy of sound waves generated by said piezoelectric film: i) enters into said elongated inner cavity via said at least one radial bore; ii) is downwardly transmitted within said elongated inner cavity towards a distal end of said housing; and, iii) exits said housing at a distal end.

According to still another aspect of the present invention the pen device farther includes a sound-reflecting external cover overlaying the piezoelectric film. The cover is configured to re-direct propagation of external sound waves downward radially outwardly. The pen device is configured such that such a majority of externally-propagating sound waves generated by said piezoelectric film is confined by said sound-reflecting external cover to propagate substantially a downward direction. The cover is connected to the housing at a proximal end of the cover and the distal end is open to facilitate downward external propagation of sound waves. The cover is made of any solid material selected from the group consisting of plastic, metal, wood and other solid material, substantially blocking propagation of ultrasonic waveform incident onto the cover.

It is also in the scope of the present invention wherein the pen device further includes an elongated rod positioned within the cavity. The rod has its operative tip extending front the housing extremity to function as a writing tip of the pen device. The rod is selected from the group consisting of a refill, a pencil tip, a marker, a plastic stylus, and an eraser. The rod is removably inserted within the housing, and movable longitudinally along the pen axis.

According to another aspect of the present invention the pen device further includes an infrared transmitter operative to emit infrared signals wherein the infrared signals and the signals emitted from the piezoelectric film provides pen location information. The infrared transmitter is positioned within the elongated cavity.

According to another aspect of the present invention the inner cavity is dimensioned to form a resonance volume, sized to be in resonance with a transmitter resonance frequency of the ultrasound transmitter.

According to another aspect of the present invention the piezoelectric film is formed from at least one material selected from the group consisting of polarized fluoropolymer, polyvinylidene fluoride (PVDF), polyvinylidene difluoride and its copolymers.

According to an embodiment of the present invention there is provided an electronic pen device including (a) an elongated housing including an elongated inner cavity, (b) an ultrasound transmitter including piezoelectric film located at the distal portion of the pen; and, (c) a sound-reflecting external cover overlaying the piezoelectric film, wherein the cover is connected the housing at a proximal end of the cover and the distal end is open to facilitate downward external propagation of sound waves; the cover is configured to re-direct external sound waves propagating outwardly radially in a downward axial direction.

According to a further aspect of the present invention there is provided an electronic pen device including (a) an elongated housing having an inner longitudinal cavity; (b) an elongated writing implement including at least an elongated rod portion, the writing implement deployed within the elongated cavity such that a distal end of the elongate rod protrudes from the housing at a distal end of the housing; (c) a circuit board mounted on an elongate surface the inner cavity; and, (d) a sensor operative to generate an electrical signal indicative of a force on a distal end of the elongated writing implement, wherein the sensor is mounted on the circuit board.

According to another; aspect of the present invention the device further includes an electronic circuitry residing on the circuit board, the electronic circuitry is operative to generate transmission signals. The circuit board includes a PCB, which includes a connection to an electric power source.

According to another aspect of the present invention, the sensor is a contact sensor and/or a pressure sensor. The pressure sensor includes a normally open pressure activated micro switch.

According to another aspect of the present invention the pen device further includes a force-transfer element for providing an outward radial force in accordance with a longitudinal force on the elongated rod portion. The force-transfer element has a first end attached to and rotated by the proximal end of the writing implement and a second end balanced about a pivot point, being movable in accordance with a longitudinal force exerted on the rod. The force-transfer element may be an integral part of the writing implement.

According to another aspect of the present invention the sensor includes a pressure activated conductive material disposed between the force-transfer element and the circuit board.

According to yet a further aspect of the present invention there is provided an electronic pen device including: (a) an elongated housing having an inner longitudinal cavity including at least one light-conveying element selected from the group consisting of a transparent region and an opening transmitting part; (b) an internal light source positioned within the inner longitudinal cavity; (c) at least one reflector located in the longitudinal cavity, the reflector being configured to reflect incident light received from the light source such that the reflected light exits the light-conveying element; the reflector is operative to increase the intensity of the emitted light; and, (d) at least one ultrasound electronic transducer selected from the group consisting of an ultrasound transmitter and an ultrasound receiver, the transducer being operative to facilitate an electronic determining of a location of the electronic pen device.

According to another aspect of the present invention the light-conveying element is selected from the group consisting of a hole, an opening, a slot, a notch or a transparent solid material. The light-conveying element is embedded with a less light-conveying element to reflect incident light received from the reflector such that the reflected light exits the light-conveying element. The light-conveying element includes a radial opening.

According to another aspect of the present invention at least a majority of the light emitted by the light source exiting from the transparent portion is reflected light.

According to another aspect of the present invention the light source includes infrared emitter.

According to another aspect of the present invention the reflector includes at least one reflecting portion deployed at different angles within the inner cavity to reflect the infrared radiation and at least one transparent portion to convey the radiation outwardly.

According to another aspect of the present invention the transparent portion is shaped in a way selected from the group consisting of a slot, a notch, an opening, and a hole. The transparent portion includes any transparent solid material, adapted to convey light signals.

According to another aspect of the present invention the reflector is formed from at least one material selected from the group consisting of metal, plastic, and other solid material. The reflector is at least partially metal-coated and substantially cylindrical.

According to another aspect of the present invention the housing primer cavity surrounding the infrared light source is reflective, preferably metal-coated.

According yet to another embodiment of the present invention there is provided an improved electronic pen system providing two modes of operations: the pen mode for tracking pen strokes, and the mouse mode where the pen serves as a mouse for a host device including: (a) an electronic pen having a housing defining a location of a writing tip; and, (b) a removable writing tip cap with a cap end structured to cover the writing tip when the pen is in a mouse mode, for deactivating the writing tip when touching a surface.

According to another aspect of the present invention the cap includes a protruding movable element peripherally extended out of the cap pressing on the writing tip for contacting the surface. The cap further includes at least one transparent portion adapted to convey signals selected from the group consisting of light signals and sound signals from the pen device to a receiver. The transparent portion is shaped in a way selected from the group consisting of a slot, a notch, an opening, and a hole. The transparent portion includes any transparent solid material, adapted to convey light signals.

According to another aspect of the present invention the pen system further includes at least one pressing button having an outer protrusion portion, adapted to perform the functions of the standard mouse "click" buttons. The pressing button is embedded in the housing or in the cap. The pressing button is configured such the inner protrusion portion is positioned above switch embedded in the housing. The cap and pressing buttons are made of plastic selected from the group consisting of polymeric materials such as polyethylene and polystyrene or epoxy, silicone, and polyurethane.

According to another aspect of the present invention the pen system further includes a software system including an electronic detector operative to detect the covering of the writing tip by the cap and to determine if the pen is in the pen mode or in the mouse mode.

According to another aspect of the present invention there is provided a removable writing tip cap with a cap end structured to cover a writing tip when a pen device is in a mouse mode, the cap includes a protruding movable element peripherally extended out of the cap pressing on the writing tip for contacting a surface; wherein the cap is operative for deactivating the writing tip when touching a surface. The cap further includes at least one transparent portion adapted to convey signals selected from the group consisting of light signals and sound signals from a pen device to a receiver. The cap also further includes at least one pressing button embedded in the cap, adapted to perform the functions of the standard mouse "click" buttons.

a. It is another aspect of the present invention to provide a method for transmitting an output signal waveform, representing the location of an electronic pen device; the method including the steps of (a) providing the electronic pen device including: (i) a piezoelectric transmitter including: (A) all elongated housing (20) including an elongated inner cavity, the housing further including a radial bore located at a lower portion of the housing; (B) a piezoelectric film deployed on the housing such that at least a portion of the piezoelectric film overlays at least one the radial bore; and, (ii) an external cover overlaying the piezoelectric film; (b) actuating the electronic pen device; (c) generating sound waves by the piezoelectric film; (d) emitting an omnidirectional output ultrasonic signal waveform which travel through the inner cavity via the at least one radial bore; and, (e) restricting the propagation of the signal downward within the inner cavity towards a distal end of the housing.

It is still another aspect of the present invention to provide a method for determining when a writing implement is against a writing surface, and the force with which the writing implement is being applied to the writing surface including the steps of (a) providing a electronic pen device including (i) a housing including an elongate surface cavity defining a location of the writing implement; (ii) a sensor having a pressure activated conductive material, (iii) a force-transfer element adjacent to the sensor and (iv) an a circuit board mounted on the elongate inner cavity; (b) applying a contact between the writing implement and the writing surface; (c) enabling a downward motion of the force-transfer element; (d) applying pressure on the pressure activated conductive material; and, (e) enabling electrical connection between the writing implement and the circuit board.

It is yet another aspect of the present invention to provide a method for transmitting from an electronic pen device a uniform radiation being operative to facilitate an electronic determining of a location of the electronic pen device, and increasing the radiation intensity, including the steps of: (a) providing an electronic pen device including (i) an elongated housing having an inner longitudinal cavity including at least one light-conveying element; (ii) an internal light source positioned within the cavity; (iii) an infrared reflector located in the longitudinal cavity and, (iv) at least one ultrasound electronic transducer selected from the group consisting of an ultrasound transmitter and an ultrasound receiver; (b) emitting a radiation within the reflector; (c) reflecting the incident radiation within the reflector received from the light source; (d) increasing the emitted radiation intensity; (e) transmitting the radiation radially out of the reflector; and, (f) transmitting the radiation radially out of the housing through the light-conveying element. The method further includes the step of coating the inner cavity to increase the radiation reflection.

a. It is yet another aspect of the present invention to provide a method for operating an electronic pen device in two modes of operations the pen mode for tracking pen strokes, and the mouse mode where the pen serves as a mouse for a host device including the steps of (a) providing a removable writing tip cap with a cap end structured to cover a writing tip of a electronic pen; the cap including (i) at least one transparent portion; (ii) a protruding movable element peripherally extended out of the cap pressing on the writing tip; and, (iii) at least one pressing button embedded in the cap; (b) deactivating the writing tip by covering the writing tip of the pen device; and, (c)moving the pen device to solicit a motion of the mouse displayed on a display screen without marking a surface. The method further includes the step of detecting a contact between the protruding movable element to a surface. The method farther includes the step of presenting a mouse cursor on the host device display screen. The method further includes the step of pressing on the pressing button to perform the functions of the standard mouse "click" buttons. The method also further includes the step of transmitting signals from the pen device to a receiver through the apertures, when the pen device is used as an electronic pen. The method also further includes the step of detecting the covering of the writing tip by the cap; and, determining that the pen is in the mouse mode.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

BRIEF DESCRIPTION OF THE FIGURES

In order to understand the invention and to see how it may be implemented in practice, and by way of non-limiting example only, with reference to the accompanying drawing, in which

FIG. 2 is a schematic cross-sectional view of a prior art pen device, showing a pressure sensor and an independent unit for actuating an infrared and ultrasound transmitters;

FIG. 9 is a schematic cross-sectional view of a second configuration of the improved electronic pen showing an external cover configured to confine the direction of propagation of sound waves in accordance with some embodiments of this invention;

FIGS. 12A and 12B are detailed partial side and front cross-sectional views of the same;

Figure 14:
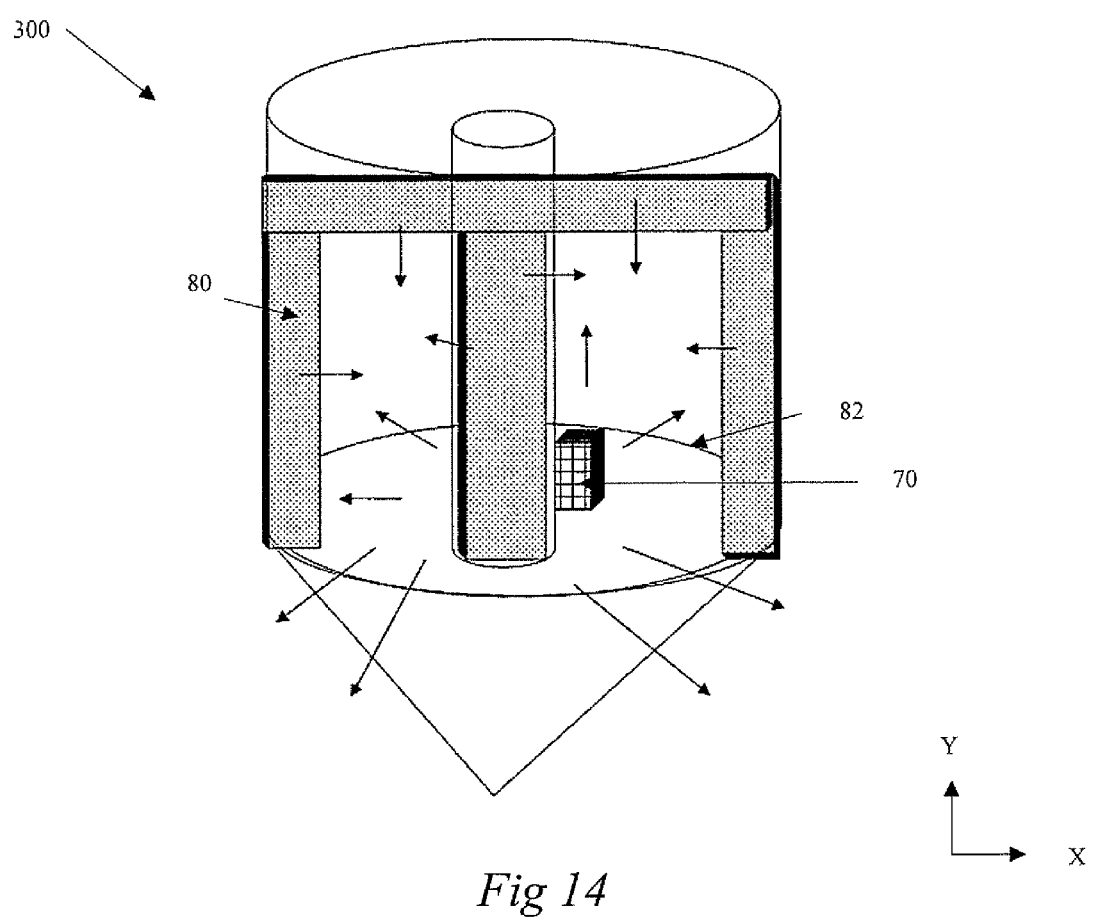
Figure 14A:
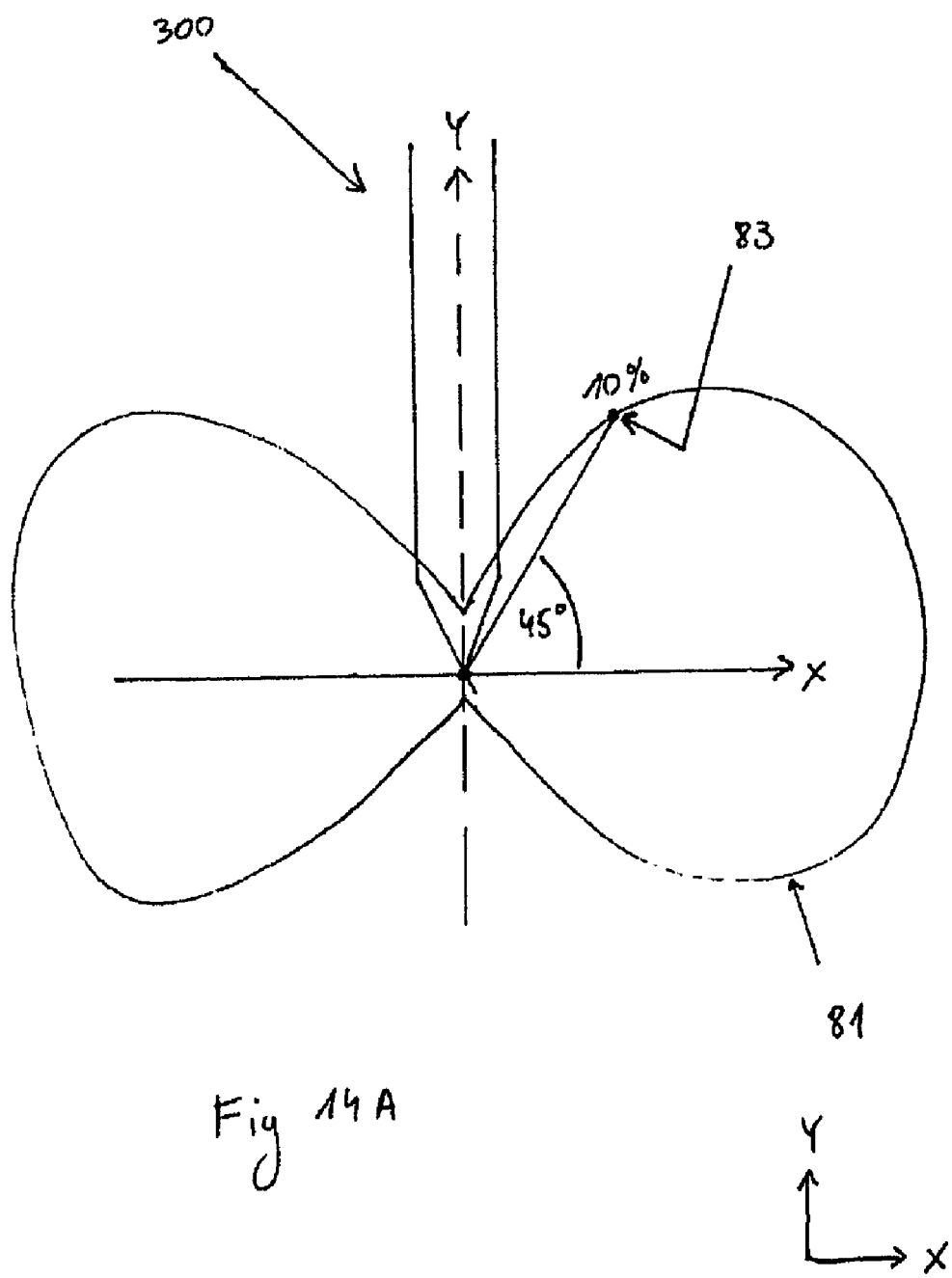
Figure 15:
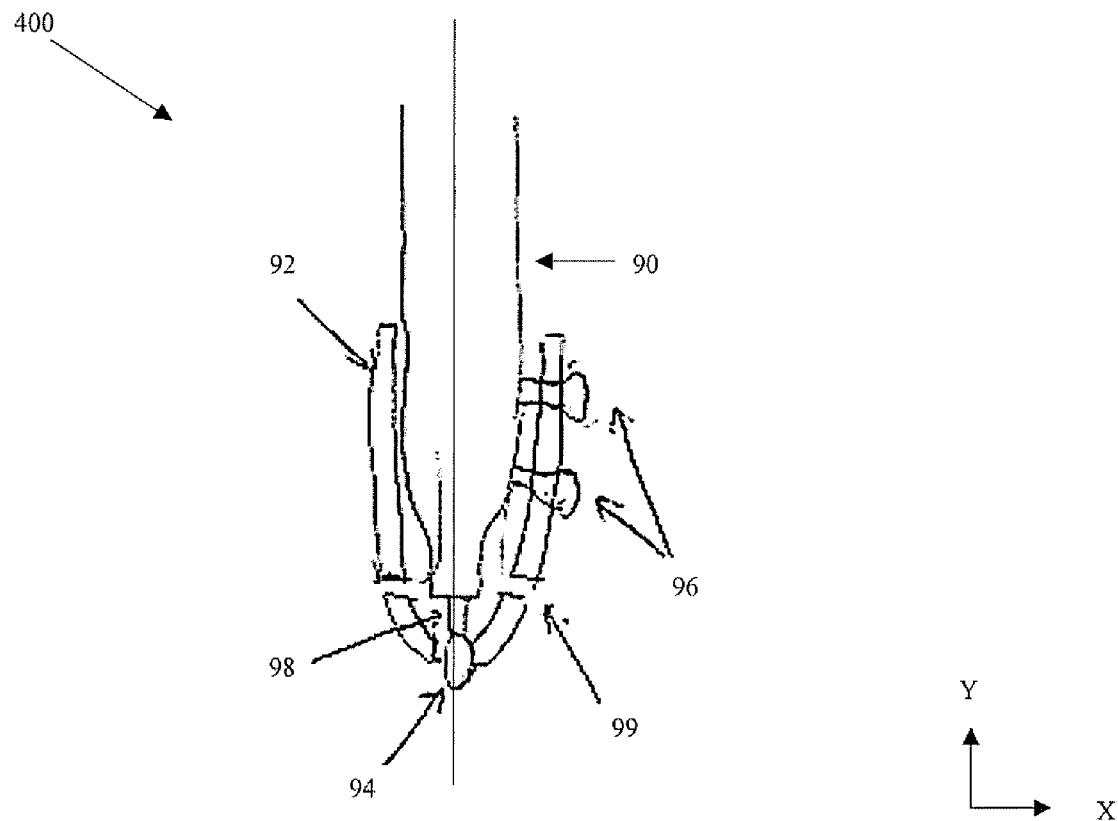

FIGS, 13A, 13B, 13C and 13D are schematic cross-sectional views of the pen device distal portion, showing a reflector for transmitting from the pen device multiple beams of light;

FIG. 14 is schematic cross-sectional view of another configuration of the same;

FIG. 14A is a graphical representation of the intensity of transmitted infrared signal as a function of direction; and, FIG. 15 is schematic cross-sectional views of the pen device distal portion, showing a pen device having an improved cap, the pen device having also functional features of a computer mouse in accordance with another embodiment of the teachings of this invention.

DETAILED DESCRIPTION OF PREFERRED EMBODIMENTS

The following description is provided, alongside all chapters of the present invention, so as to enable any person skilled in the art to make use of said invention and sets forth the best modes contemplated by the inventor of carrying out this invention Various modifications, however, will remain apparent to those skilled in the art, since the generic principles of the present invention have been defined specifically to provide a pen device, which can be used for digitizing graphical or textual data drawn on every writing surface.

All references cited herein are incorporated by reference in their entirety. Citation of a reference does not constitute an admission that the reference is prior art.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The articles "a" and "an" are used herein to refer to one or to more than one (i.e., to at least one) of the grammatical object of the article By way of example, "an element" means one element or more than one element.

The term "including" is used herein to mean, and is used interchangeably with, the phrase "including but not limited to".

The term "or" is used herein to mean, and is used interchangeably with, the term "and/or," unless context clearly indicates otherwise.

The term "such as" is used herein to mean, and is used interchangeably, with the phrase "such as but not limited to".

The term 'plurality' applies hereinafter to any integer greater than or equal to one.

The term 'about' refers hereinafter to a tolerance of ±50% of the defined measure In some embodiments, the tolerance is ±20%.

The term 'piezoelectric film' refers in the present invention to any polarized fluoropolymer, polyvinylidene fluoride (PVDF) and its copolymers. It also refers to similar material having an equivalent function.

The term "writing surface" relates to an object on which the user writes (typically planar), and may have a "thickness" (for example, a "portable" writing surface such as paper) and may also be referred to herein as a board. The term writing surface may refer to a computer screen, a transparent overlay, a piece of paper, or any other object on which one may write or to which one may point.

The term 'micro switch' refers to an electric switch designed to be actuated by the physical motion of a writing implement.

The term "downward" refers hereinafter to the direction along the pen axial axis toward the writing surface.

The term "external propagation of sound waves" refers hereinafter to the propagation of the emitted sound waves out of the pen housing.

The term "elongated writing implement" refers hereinafter, to an object whose function is to contact the writing surface when the user writes with the pen. The 'elongated writing implement' may includes at least a rod potion deployed within an elongated inner cavity of the pen housing and optionally a tip at the distal end—the elongated writing implement optionally may have a marking tip or a non-marking tip. The term "pen axis" refers hereinafter to the axial longitudinal axis of the pen.

The term "contact sensor" refers hereinafter to a sensor adapted to determine if the writing implement located in the pen is in contact with the writing surface.

The term "pressure sensor" refers hereinafter to a sensor adapted to determine the presence and/or magnitude of the force applied on the rod.

The present invention will now be described in terms of specific, example embodiments. It is to be understood that the invention is not limited to the example embodiments disclosed. It should also be understood that not every feature of the improved system for transmitting sound; improved system for transmitting light; improved system for detecting pen up/pen down; improved mouse system; and methods of manufacturing and using the same described is necessary to implement the invention as claimed in any particular one of the appended claims.

Improved System for Transmitting Sound

Figure 5:
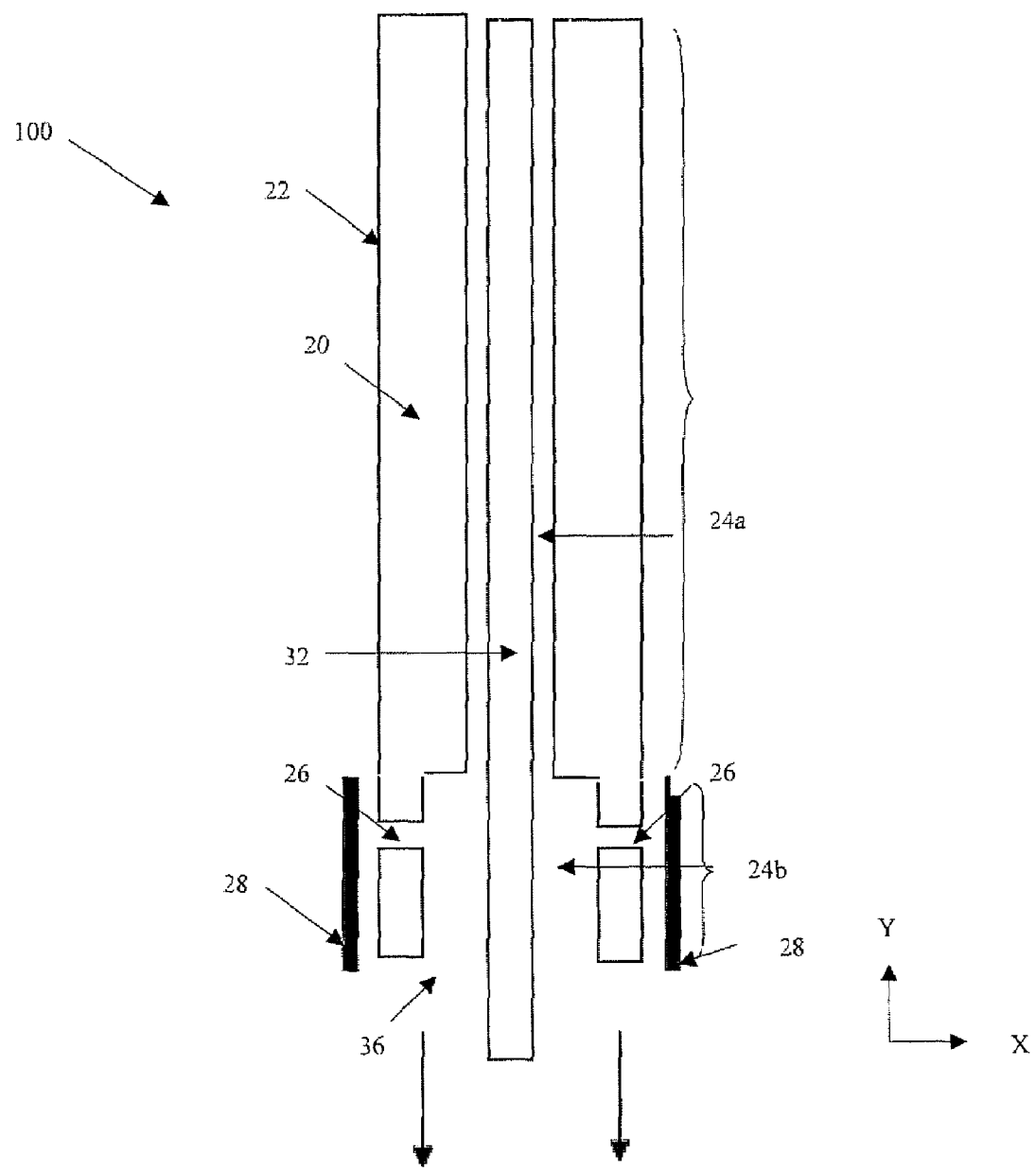
FIG. 5 is a detailed schematic cross-sectional view of the same.
Figure 6:
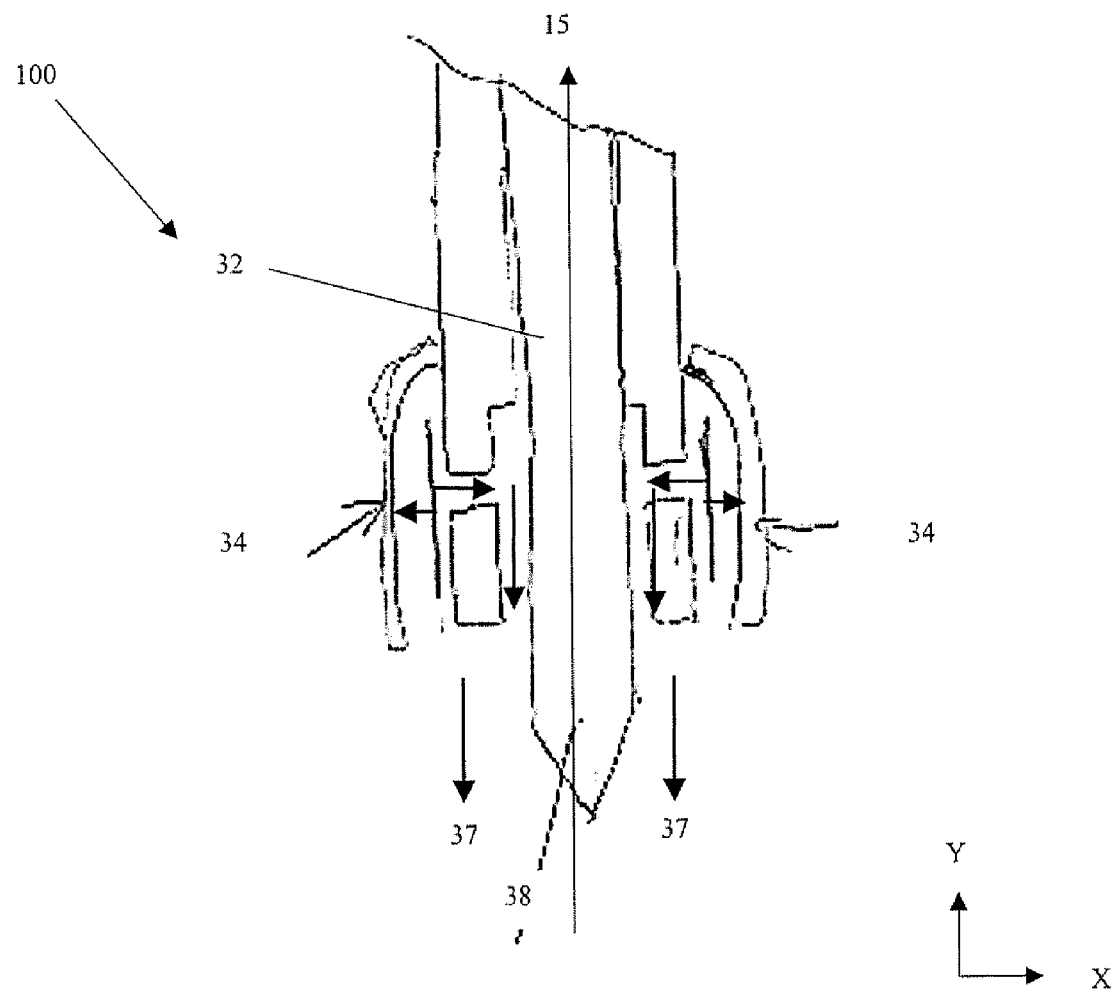
FIG. 6 is a schematic cross-sectional view of the same showing an external cover configured to confine the direction of propagation of sound waves in accordance with some embodiments of the present invention.

The pen device according to some embodiments of the present invention is schematically characterized by FIGS. 5 and 6.

Figure 1:
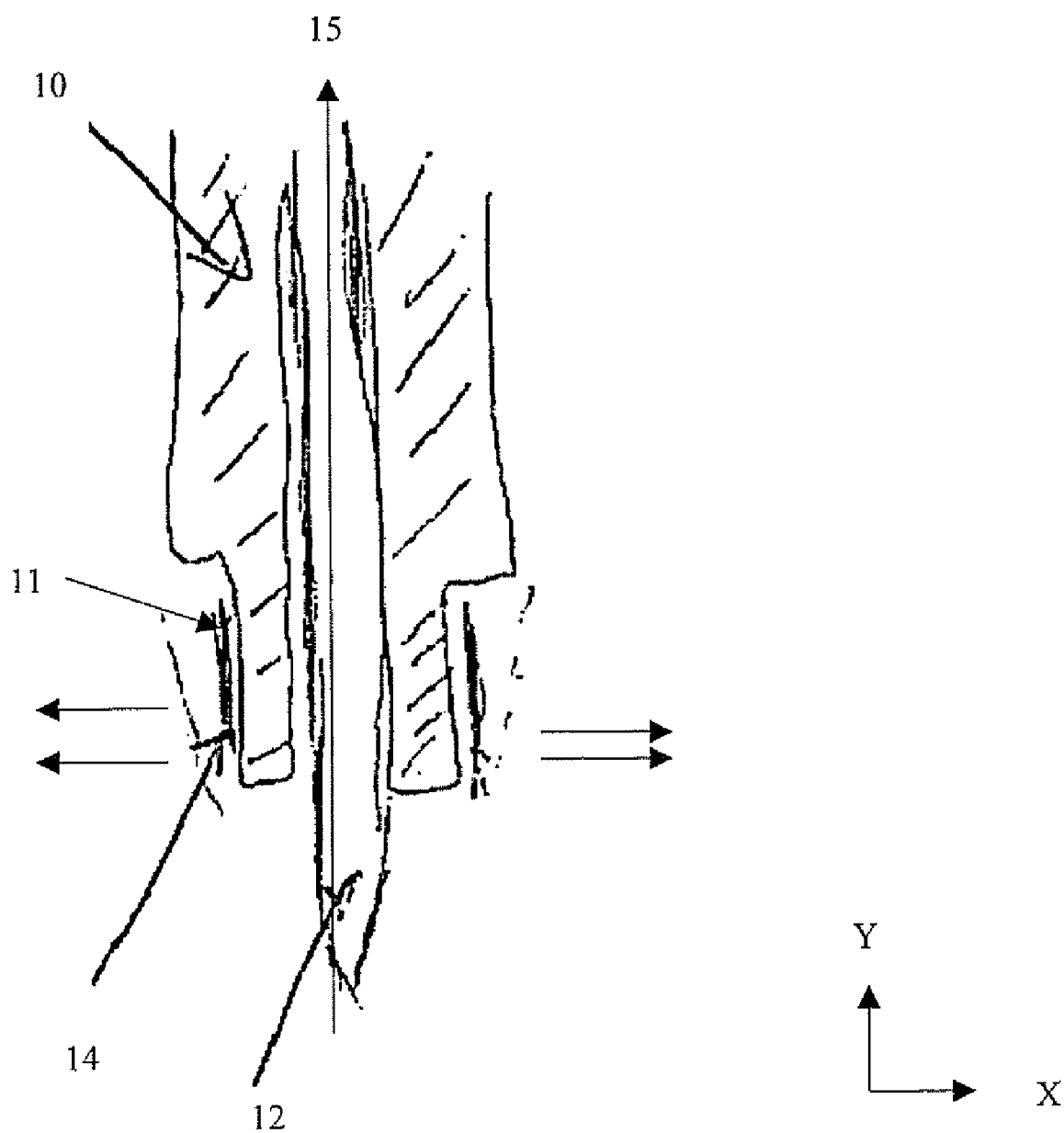
FIG. 1 is a schematic cross-sectional view of a prior art pen device, showing a piezoelectric transmitter emitting signals propagating perpendicularly to the pen device longitudinal axis.
Figure 3:
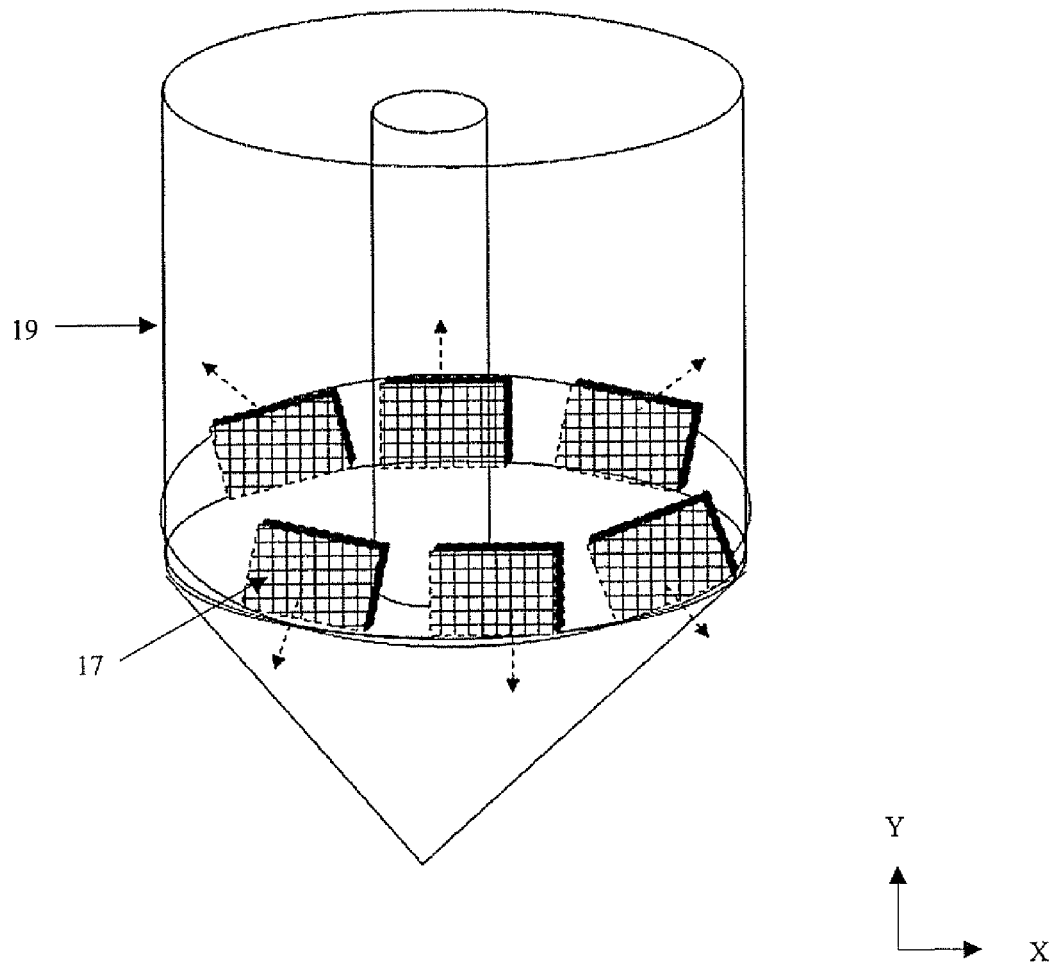
FIG. 3 is a schematic cross-sectional view of a prior art pen device, showing a plurality of externally-deployed infrared light sources.
Figure 4:
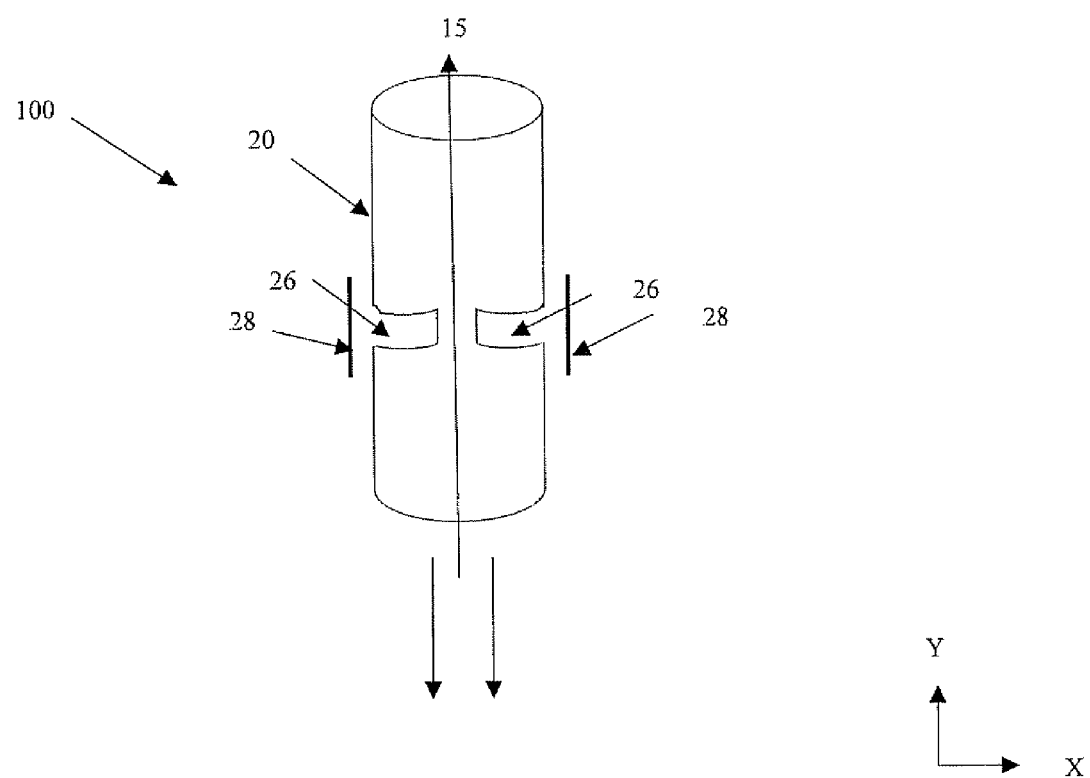
FIG. 4 is a schematic perspective view of a housing of an improved electronic pen, according to one embodiment of the present invention.

FIG. 4 shows a perspective view of a cylindrical housing 20 having a central longitudinal axis 15. Housing 20 may be made of any solid material, such as plastic, metal, wood or other solid material. Housing 20 includes at its distal end a radial bore 26.

In the example of FIGS. 4-7, a piezoelectric film 28 externally deployed on a part of housing 20, overlays radial bore 26, and converts electrical energy into ultrasound signals. Piezoelectric crystals have the property of changing size when an electric voltage is applied to them. By applying an alternating electric voltage (AC) on a piezoelectric crystal, the crystal is caused to oscillate producing ultrasound signals. Piezoelectric film 28, typically having a cylindrical shape, has outer and inner conductive layers. The outer and inner conductive layers are electrodes, which typically are physically or chemical deposited onto piezoelectric film 28. In a preferred embodiment, the piezoelectric film is composed of polyvinylidene difluoride (PVDF) or of copolymers of PVDF.

FIG. 5 shows a cross section view of the distal portion of a pen device 100. Housing 20 includes an inner elongated cavity 24 having a non-uniform cylindrical shape divided into two portions i.e. the upper narrow portion 24a and the lower wider portion 24b. The upper portion radius is substantially smaller than the lower portion radius. There is no explicit limitation on the value of the radius for the narrow portion and the value of the radius for the wider portion. In some non-limiting embodiments, the radio is between the value of the radius for the narrow portion and the value of the radius for the wider portion is between 0.2 and 0.9, preferably 0.7. In exemplary non-limiting embodiments, the ratio radius of the inner portion is in the range of about 1.3 to 2 mm, preferably 1.7 mm and the radius of the wider portion is in the range of about 1.5 to 4 mm, preferably 2.275 mm. Elongated rod 32 is located within cavity 24. The upper portion radius is slightly greater than the radius of a rod 32, defining a space preferably adapted to allow a displacement of rod 32 upwardly and downwardly. In exemplary non-limiting embodiments, the radius of the rod is in the range of about 1.3 to 2 mm, preferably 1.675 mm. In exemplary non-limiting embodiments, the space is in the range of about 0.001 mm to 0.5 mm preferably 0.025 mm. The length of the wider portion is in the range of about 2.5 to 4 mm, preferably 3.3 mm. Housing 20 having a substantially cylindrical cavity 24 terminates at its lower end in an annular opening 36.

As illustrated in FIG. 6, a rod 32 is located within cavity 24 having its operative tip 38 extending through opening 36, In one non-limiting example, the distance between operative tip 38 and the extremity of housing 20 may be, for example, a few mm to preserve a visibility of the tip. Rod 32 may be, but is not limited to a marking tip including an ink refill, a pencil tip, a marker or a non-marking tip such as a stylus tip, or an eraser. Rod 32 can be removably inserted and reversibly deployed within housing 20, to be replaced with a new one when ink runs out.

The signal emitted from piezoelectric film 28 propagates omni directionally (in both directions: internally and externally). An external cover 34 overlays piezoelectric film 28 and operates to reflect the ultrasonic waveform emitted by piezoelectric film 28. The term "overlay" refers hereinafter to the superimposition of piezoelectric film 28 and external cover 34 wherein there is no required contact between piezoelectric film 28 and external cover 34. In some embodiments, having portions or the entirety of piezoelectric film 28 allows piezoelectric film 28 to vibrate.

Cover 34 may be include, for example, of any solid material that reflects incident sound waves and/or that prevents incident sound waves from propagating through cover 34—including but not limited to as plastic, metal, wood or other solid material. Cover 34 also protects piezoelectric film 28 from mechanical damage. As illustrated in the figures, cover 34 may be configured to inwardly reflect radially outwardly propagating sound waves and/or to reflect in a 'downwards direction' sound waves propagating along a vector that has a radial outward component. The term "outwardly propagating sound waves" refers hereinafter to sound waves generated by piezoelectric film 28 that are propagating outside of housing 20 of pen 100 but possibly within cover 34, Furthermore, cover 34 may be operative to 'block' radial outward propagation of sound waves. Therefore, signals 37 emitted from pen device 20, can not be emitted perpendicularly to axis 15 as in conventional prior art devices, and are hence restricted to be emitted substantially in axis 15 direction. Signals 37 propagate then in the writing surface.

According to another embodiment of the present invention, cover 34 is oriented substantially parallelly to the pen axis 15, being configured to substantially confine the direction of the signals emitted from pen device 100. The term "substantially parallelly" refers hereinafter to the shape of the cover designed in a way that it is parallel in principle to the longitudinal pen axis 15, but due to design reasons it might be slightly rounded in the connection between cover 34 and housing 20.

According to another embodiment of the present invention, cover 34 is commented to housing 20 a proximal end of cover 34 and the distal end is open to facilitate downward external propagation of sound waves. The term "open" refers hereinafter to distance between the distal end of cover 34 and housing 20 enabling propagation downward along pen axis 15.

Figure 7:
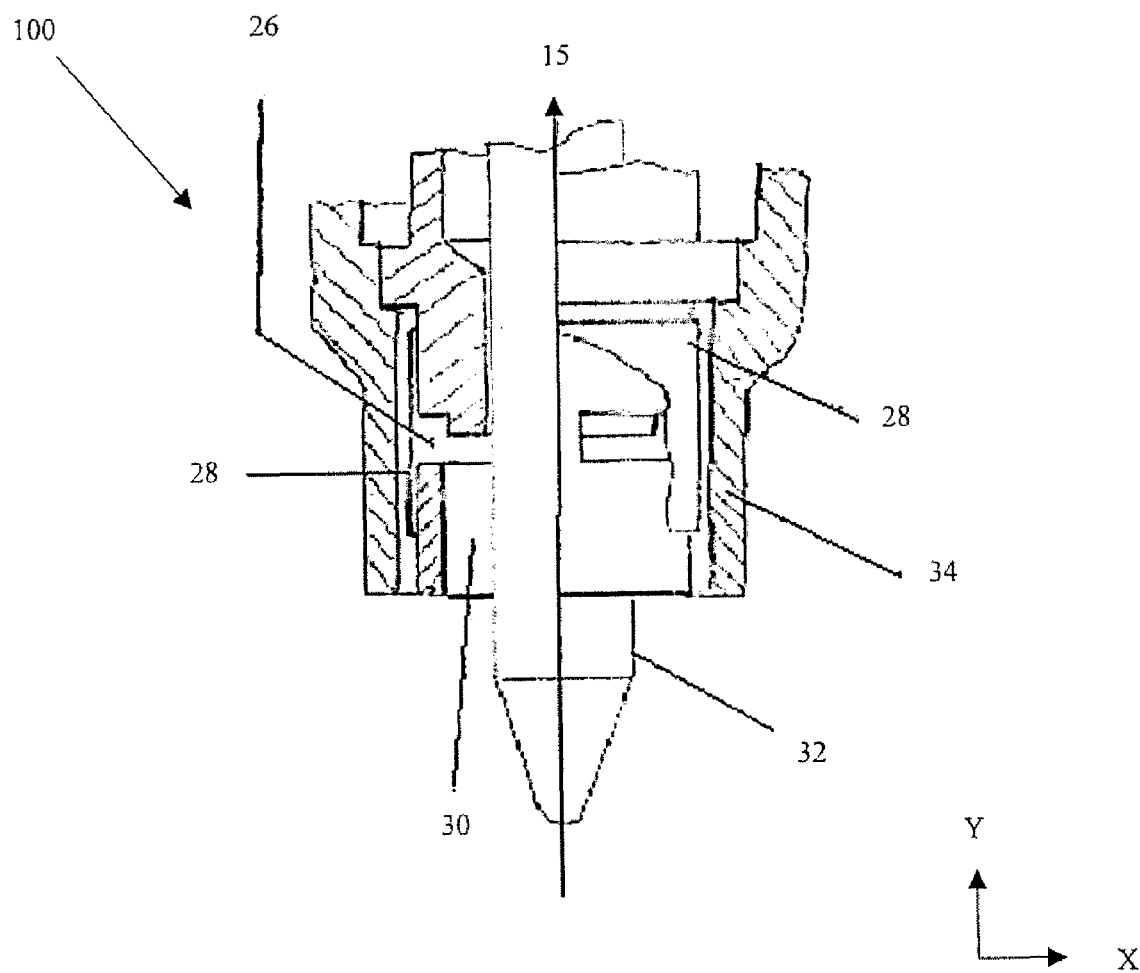
FIG. 7 is a detailed schematic cross-sectional view of the same.

FIG. 7 is a detailed schematic side cross-sectional view of the distal portion of pen device. According to another embodiment of the present invention, the pen device includes an ultrasound transmitter formed as a substantially annular piezoelectric transmitter element. The transmitter also includes electrical leads (not shown) such as a pair of wires or any other electrically conductive object which is electrically coupled (for example, by electrical contacts) with piezoelectric film 28. This electrical signal may be produced by electronic circuitry controlling the ultrasound emission, When a voltage is applied to the sides of piezoelectric film 28, film 28 vibrate emitting ultrasonic signals. As a result, piezoelectric film 28 serves as a transmitter of ultrasonic waves The voltage applied on the sides of film 28 produces vibrations, external to frame housing 20, Since piezoelectric film 28 is flexible, the oscillations generate ultrasonic waves traveling toward inner cavity tapered lower portion 24b.

According to another embodiment of the present invention, the pen device is configured so that a majority of sound energy of sound waves generated by the piezoelectric film (i) enters into the elongated inner cavity via the at least one radial bore; (ii) is downwardly transmitted within the elongated inner cavity towards a distal end of the housing; (iii) exits the housing at a distal end. The term "configured" in reference to the pen device refers hereinafter to the any combination of configuration of the shape of the housing and/or of the placement of the film, and/or of the shape of the inner cavity and/or of any other design condition of the elements included in the pen device.

According to another embodiment of the present invention, the pen device such that such a majority of externally-propagating, i.e. as measured by energy, sound waves generated by the piezoelectric film is confined by the sound-reflecting external cover to propagate substantially in a downward direction. The term "substantially in a downward direction" refers hereinafter to propagation in an angle of the general direction of less than about 45 degrees defined between the propagation and the pen axis.

According to another embodiment of the present invention, when film 28 vibrates a sound wave enters into lower portion 24b via at least one radial bore 26, this sound wave then travels through lower portion 24b. In addition, vibration of film 28 may generate radially outwardly propagating sound waves which are, in turn, reflected to propagate in an inward direction and enter into lower portion 24b via radial bore 26. In some embodiments, a majority of the ultrasound energy of should waves produced by vibrating film 28 is, after entering the lower portion 24b via at least one radial bore 26, directed downward through annular opening 36, while a minor amount of the energy such as heat is absorbed within cavity 24.

According to another embodiment of the present invention, lower portion 24b, is configured to form a acoustic aperture or resonance volume, sized in accordance with the transmitter resonant frequency to transfer a maximum (or near-maximum) energy from the lower portion of the pen, and hence to increase the emitted signal, increasing the sensitivity of device 100.

Figure 8:
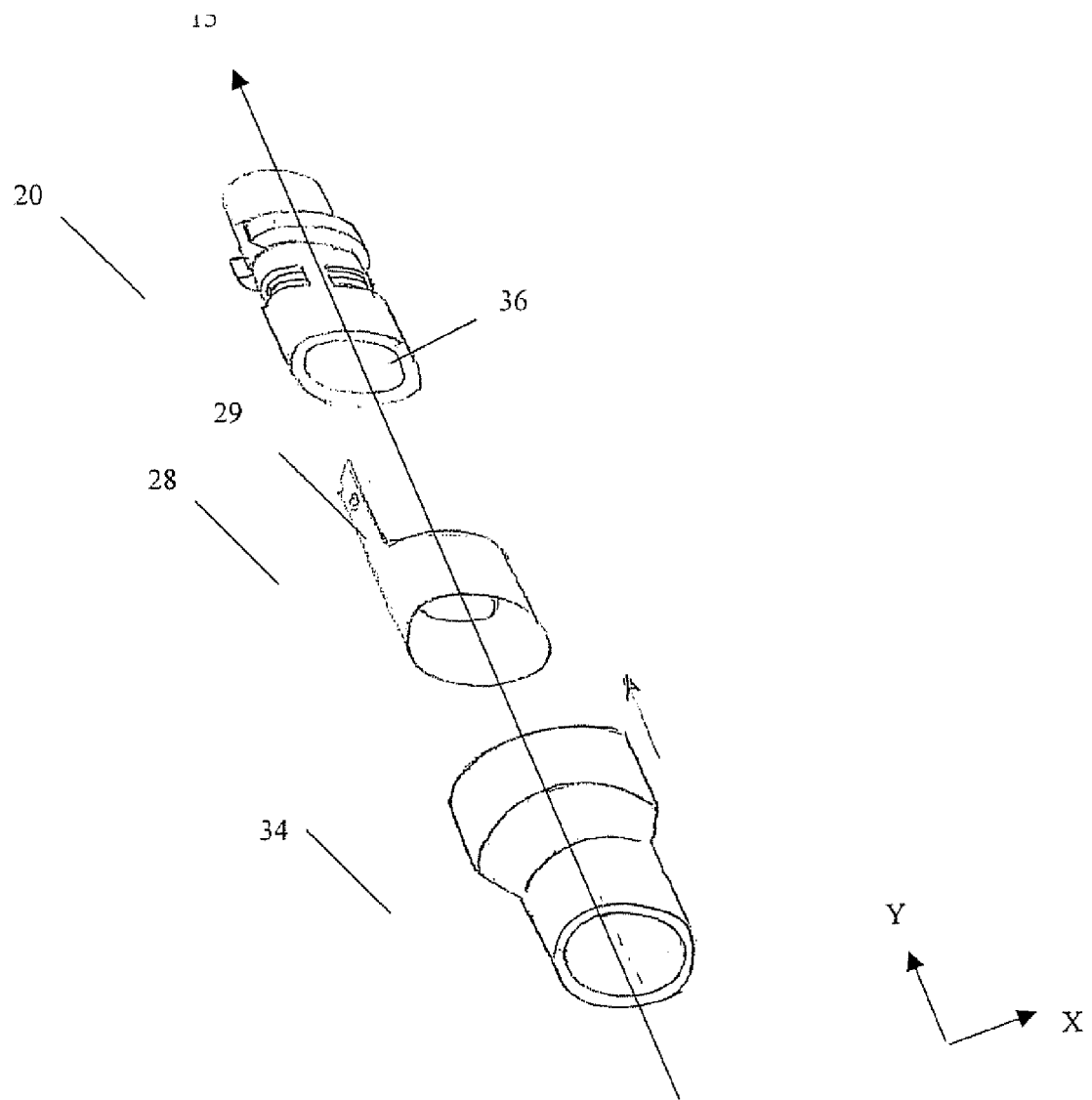
FIG. 8 is an exploded perspective view illustrating functional components of the pen device distal portion.

FIG. 8 is an exploded perspective view illustrating functional components of the pen device distal portion according to some embodiments. The distal portion includes three layers; the first layer is cylindrical housing 20, according to one embodiment of the present invention, Housing 20 having a substantially cylindrical cavity terminates at its lower end in an annular opening 36. Operative tip 38 of rod 32 is especially adapted to extend through annular opening 36.

The second layer 28, adapted to overlay the first layer, is a cylindrical piezoelectric film, having a protruding end 29 including inner and outer conductive layers especially adapted to be connected to an external circuit which applies electrical contact to the sides of piezoelectric film 28. The conductive layers are selected from a group including electrodes or electron conducting metal film. Piezoelectric film 28 receives an electrical signal from electrical leads such as by a pair of wires or any other electrically conductive object which is electrically coupled (for example, by electrical contacts) with piezoelectric film 28. This AC electrical signal, for example one or more excitation pulses, may be produced by electronic circuitry (not shown), for example associated with, attached to or embedded in the stylus, powered with an electrical power source (not shown). There is no limitation on this electrical power source (not shown). It may include a battery (such as a rechargeable battery) or may include a rechargeable "capacitor." It is recognized that the latter may be rechargeable over a shorter time scale, and thus, in some embodiments, an electronic "Sink well" is provided, which a user may engage to recharge the capacitor.

In exemplary non-limiting embodiments, the radius of piezoelectric film 28 is about 2-3 mm and the length of piezoelectric film 28 is between 2 and 5 mm.

The third layer 34, adapted to overlay second layer 28, is a cover 34 operating to reflect the ultrasonic waveform emitted by piezoelectric film 28. Cover 34 also protects piezoelectric film 28 from mechanical damage, and forms the finger support of pen device 100.

According to another embodiment of the present invention, device 100 also includes an infrared transmitter (not shown) positioned within elongated cavity 24, operative to emit infrared signals wherein the infrared signals and the signals emitted from the piezoelectric film provides pen location information, The term "pen location information" refers hereinafter to the timing information for time-of-flight between the ultrasound and/or transmitter and each ultrasound and/or infrared receiver useful for determining the location of the pen by triangulation.

A second configuration of pen device 100 is shown in FIG. 9. Pen device 100 includes an ultrasound transmitter including piezoelectric film 28 located at the distal portion of the pen below housing 20; and, an external cover 34 overlaying piezoelectric film 28. Cover 34 positioned below housing 20, is configured to substantially reflect the direction of the signals emitted from the pen device, in such a manner as to allow propagation of ultrasonic waves downward in pen axis 15 direction. Cover 34 is also configured to block radially outward propagation of sound waves The extremity of housing 20 is connected to the proximal end of cover 34. Cover 34 includes an inner cavity 29 terminates at its lower end in an annular opening 31, Rod 32 is located within housing 20 having its operative tip 38 extending through opening 31.

It will be appreciated by one ordinarily skilled in the art that other features of the prior art pen devices described hereinabove and novel features of the pen devices according to the various aspects of the present invention as further described herein can be combined to operate with device 100.

Improved System for Detecting Pen Up/Pen Down

According to another aspect, the present invention provides a pen device including a contact and/or pressure sensor. The pen device according to this aspect of the present invention is shown in FIG. 11 and FIG. 12A-B and is referred to herein below as device 200.

Figure 10:
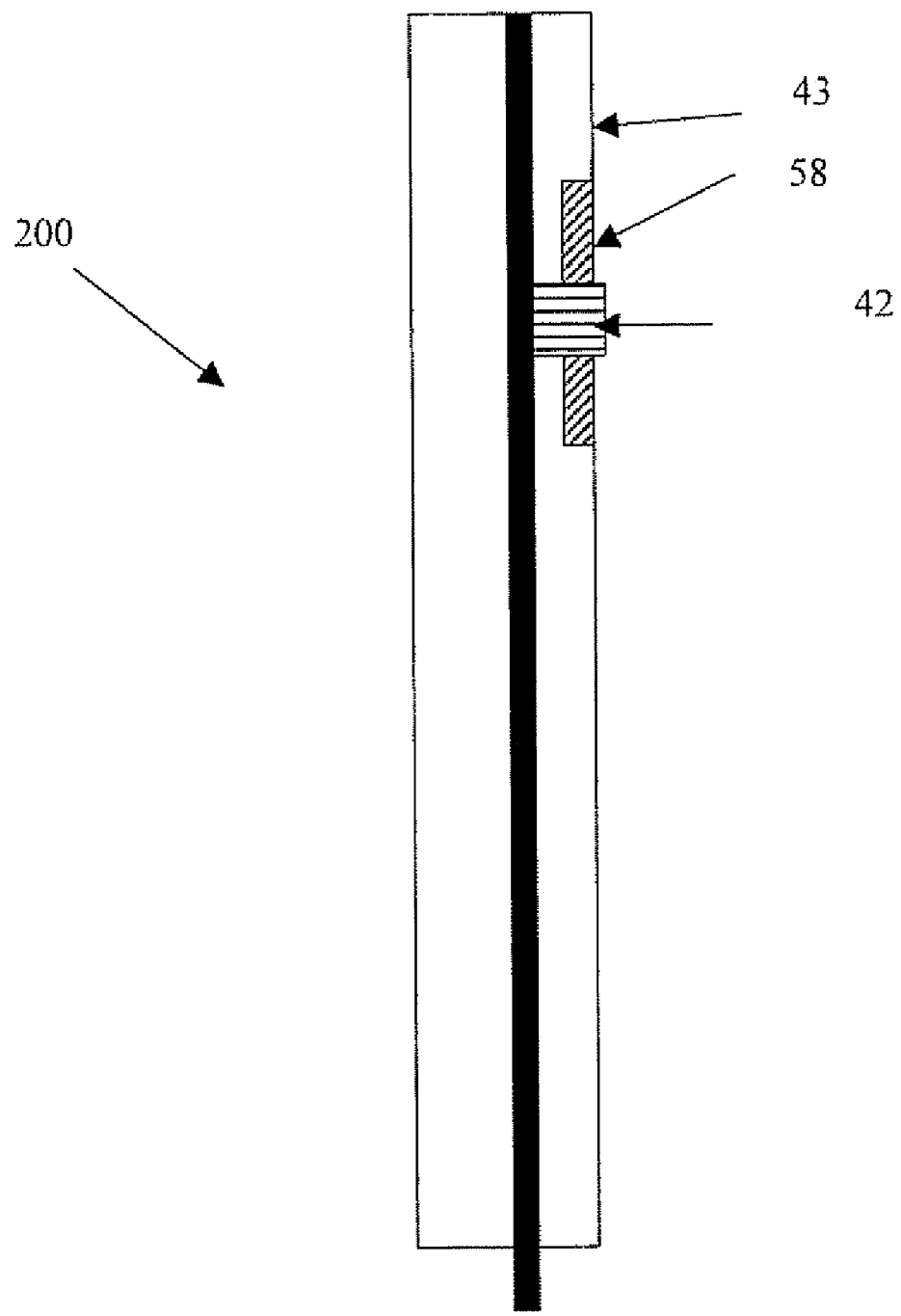
FIG. 10 is a schematic simplified cross-sectional view of the pen device, showing a pressure activated micro switch, according to another embodiment of the present invention.

Turning now to FIG. 10, this is a schematic side cross-sectional view of the pen device, illustrating a contact and/or pressure sensor 42 connected to an electronic circuitry (58) especially a PCB which hosts electronics for operating an ultrasound transducer and/or an optical transmitter or receiver useful for sending or receiving signals for determining pen location. The circuit board is mounted on an elongate surface 43 of the housing cavity The term "mounted on an elongate surface" refers hereinafter to the position of the circuit board in the longitudinal pen axis direction.

Figure 11:
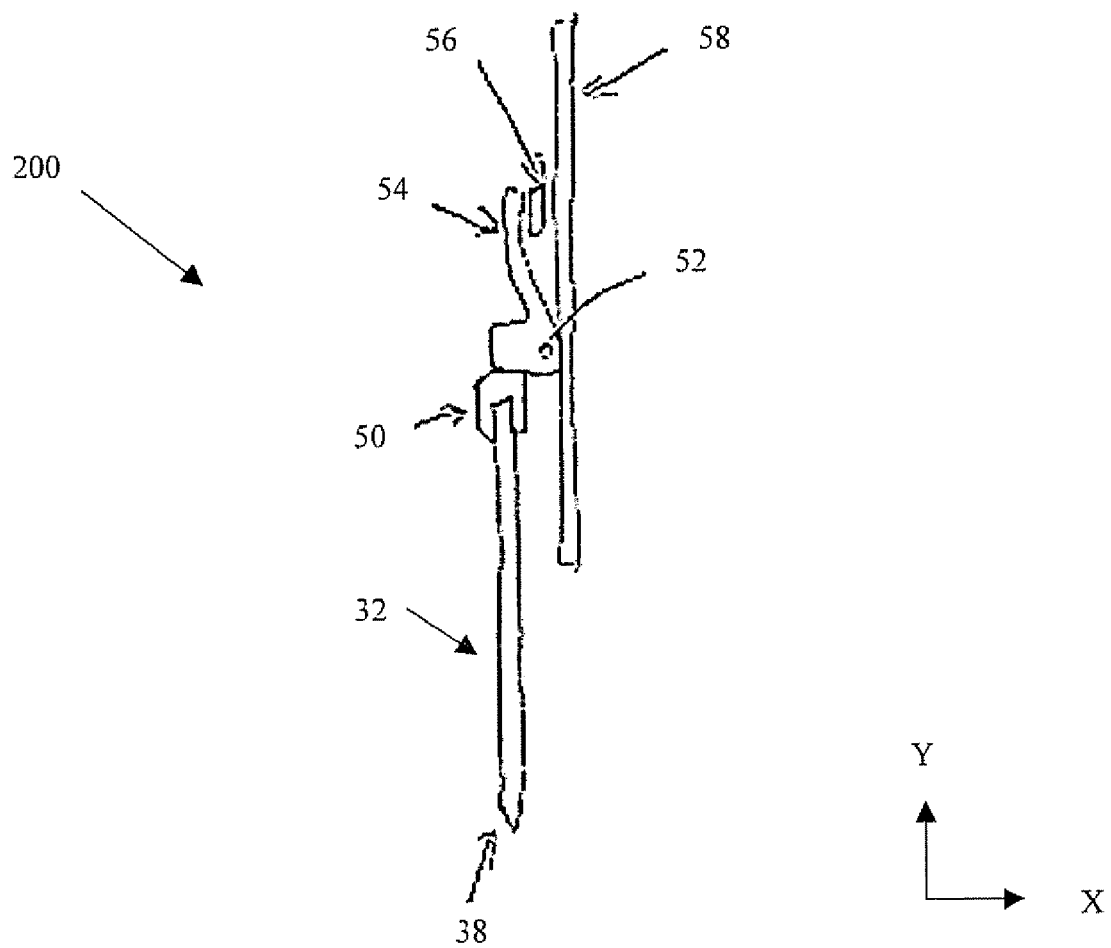
FIG. 11 is a schematic detailed cross-sectional view of the same.
Figure 13A:
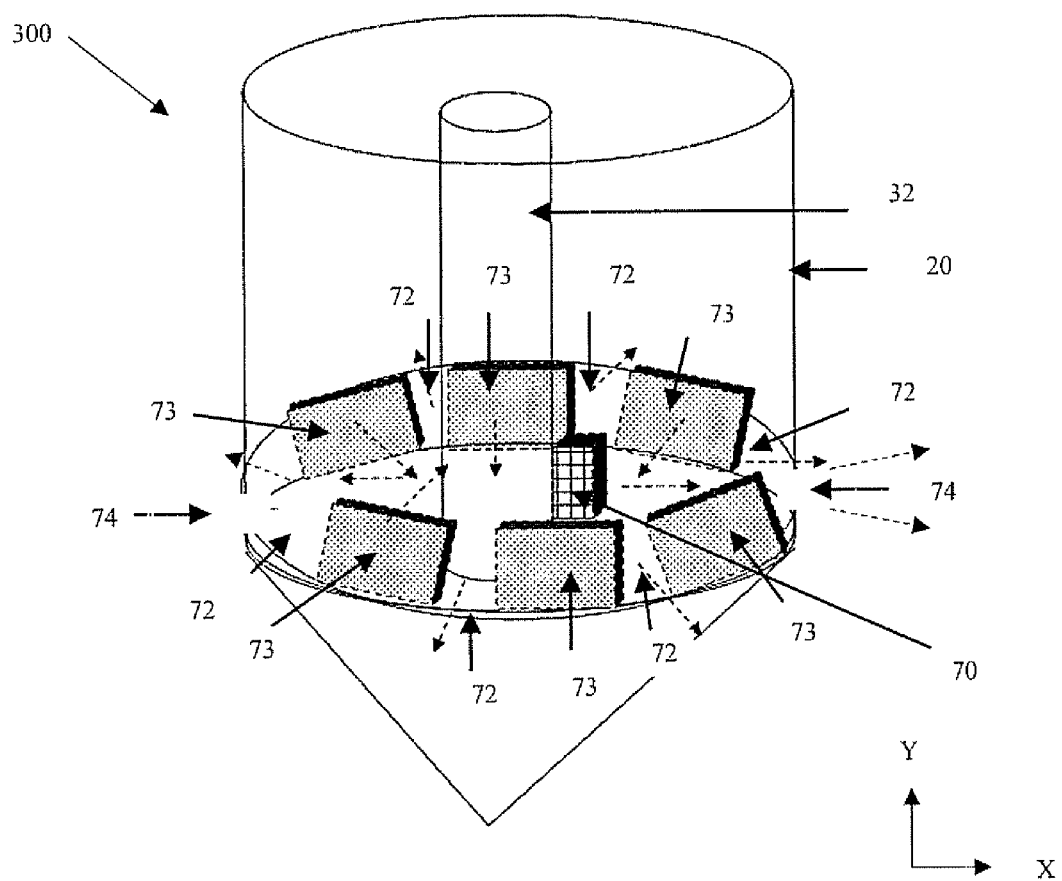

As illustrated in FIG. 11, pen device 200 also includes within the hollow housing, a holder 50 for releasably retaining the removably attached rod 32; a contact and/or pressure sensor, being actuated when contacted by a force transfer element, such as a lever 54. Lever 54 is useful for converting axial motion and/or force applied on the tip of the rod upon contacting and/or pressing upon the writing surface into radial motion on the sensor, so as to be responsive to a longitudinal force exerted on writing tip 38 of rod 32; and an electronic circuitry disposed along the pen axis, being electronically communicating with sensor 42 for affecting operation of pen device 200 at least when sensor 42 indicates that a force and/or a magnitude of a force is exerted on writing tip 38 of rod 32. The force applied on rod 32 is upward and in the direction of the pen axis.

According to another embodiment of the present invention lever 54 is integrally formed with the writing implement The rod and the lever are integrally formed within a single object i.e. the elongated writing implement.

The sensor is configured as a pressure activated micro switch, which allows pen device 200 to determine when rod 32 is against a writing surface and the force with which rod 32 is being applied to the writing surface, thereby allowing pen device 200 to determine when the user is writing as well as the fineness or thickness of a line being drawn. Micro switch is configured such that, when rod 32 is in contact with the writing surface, holder 50 is actuated in direction of the pen axis, enabling a downward motion of lever 54 around pivot point 52. Rotating lever 54 has a first end attached to and rotated by holder 50 and a second end. Rotating lever 54 actuated by holder 50 is upwardly and downwardly movable according to the amount of the force exerted on rod 32. Lever 54 transforms the pressure applied on rod 32, which has a direction parallel to the pen axis to a pressure applied perpendicularly to the pen axis. This is an important advantage of the present invention which reduces the rod movement during the sensing.

Second end of lever 54 mechanically presses on a pressure activated conductive material 56. In exemplary non-limiting embodiments, the pressure activated conductive material may be rubber materials such as commercially available pressure-activated conductive ZOFLEX® ZL60.1, Xilor Inc, which becomes conductive under pressure. A permanent contact between lever 54 and conductive material 56 is assured due to a spring (not shown) positioned below holder 50. An electrical connection is therefore enabled between rod 32 and an electronic circuitry actuating ultrasound transmitter 40 and an infrared transmitter (not shown), preferably a Printed Circuit Board (PCB) 58, which includes a connection to an electric power source, such as a miniature battery, PCB 58 is disposed adjacent to conductive material 56 and is oriented parallel to the pen axis. PCB 58 is responsive to the opening and the closing of the micro switch to affect a signal transmitted by transmitter device 40. Pen device 200 thus identifies that a writing action is being performed, and movements of pen device 200 are interpreted as writing movements When the pressure is removed from rod 32, lever 54 springs back to its original state Thus, this sensor detects the force applied to the tip of the rod by sensing pressure; in addition, it also detects the up/down movement of pen device 200.

FIGS. 12A and 12B are detailed partial side and front cross-sectional views of micro switch 500 in accordance with the teachings of this inventions Micro switch 500 is configured such that, when rod 32 is in contact with the writing surface, holder 50 is actuated in the pen axis direction. Lever 54 is configured as a roughly L-shaped lever having a first end attached to and rotated by holder 50 and a second end balanced about a pivot point 52. Lever 54 is preferably formed from a conductive material such as metal, also having elastic properties. Holder 50 overlaps the lever first end and the lever second end is in contact with conductive material 56. When holder 50 is actuated in the pen axis direction, lever 54 is activated downward, in a direction perpendicular to the pen axis. In principle, release of the pressure on conductive material 56 allows conductive material 56 to return to its initial state, thereby breaking the circuit. However, in practice, the relaxation response lime of conductive material 56 is typically quite slow. For this reason lever 54 has elastic properties such that, when the pressure is released, lever 54 is lifted immediately so as to break the circuit. When writing implement 38 is not in use, lever 54 urges rod 3 downwards so as to open micro switch 500. Micro switch 500 also includes a protecting cover 60, defining a restraining arm 62, surrounding the distal portion of lever 54 and conductive material 56, separated from holder 50 by a protection gap 64, Restraining arm 62 limiting the holder displacement prevents system damages if an excessive pressure is applied on rod 32. The reduction of the rod motion during the pressure and contact sensing, is an important advantage of pen device 200, contributing for efficient accurate operation of micro switch 500, and for the non-disturbance of the user writings movements.

It will be appreciated by one ordinarily skilled in the art that other features of the prior art pen devices described hereinabove and novel features of the pen devices according to the various aspects of the present invention as further described herein can be combined to operate with device 200.

Improved System for Transmitting Light

According to another aspect, the present invention provides a pen device including a reflector for transmitting from the pen device multidirectional beams of light. The pen device according to this aspect of the present invention is shown in FIG. 13A-D and FIG. 14 and is referred to herein below as device 300.

Commercially available pen devices usually operate with both ultrasound and infrared (IR) transmitters. The position of the writing implement is derived from the time-of-flight (TOF) of ultrasound signals from the writing implement to the receiver by triangulation. The IR signal provides synchronization information, as well as carrying additional information such as, for example, the color of the writing implement being used. Conventionally, infrared light sources are implemented at the distal end of a pen device for directing inflared radiation emitted thereby through the pen device housing. Because of the cylindrical shape of the housing, the infrared interface must have 360 degrees angular communications range around the pen longitudinal axis, to transmit an accurate signal. Typically, a plurality of infrared light sources, such as light-emitting diode (LED), are disposed all around the housing to obtain a good uniformity of the light transmission over the 360 degrees angular communications range around the pen longitudinal axis.

As illustrated in FIG. 13A-13D, to obtain a good uniformity of the light transmission over the 360 degrees angular communications range around the pen axis, involving only one LED 70, an infrared reflector 72 is supplemented in the longitudinal inner cavity of the housing.

Reflector 72 surrounds LED 70 and conveys the infrared radiation out of housing 20. Housing 20 is mostly non-transparent having slots or small transparent regions to convey the reflected light. The radiation is transmitted out of the housing through a plurality of slots, or transparent layers 74. The intensity of light leaving the slits/transparent part is increased.

According to another embodiment of the present invention, at least a majority of the light exiting from the transparent portion is reflected light. Only one LED 70 is therefore positioned within housing 20, adjacent to a rod 32. FIGS. 13B and C show the positioning of LED 70 into housing 20 and reflector 72.

Optionally, reflector 72 is a metal ring having a reflectivity of about 85% with notches 76 or a metal-coated plastic ring with uncoated transparent parts as represented in FIG. 13D. The metal ring may also include an upper and under plane to obtain a higher reflectivity. The notches allow the transmission of the radiation out of the reflector, while the metal part 73 of the reflector reflects the radiation. The reflector may be configured to have more notches or transparent spaces in the portion surrounding the backside of the LED, The distance between notches 76 may also be small enough to assure that the detector positioned close to the pen device will not detect only a shadow signal.

A second configuration is to be discussed with reference to FIG. 14. The reflector is a reflecting ring 80 having a reflectivity of 50% to 100% without notches and operates as an integrator. A transparent ring 82 is located below the metal ring. Transparent ring 82 allows the transmission of the radiation out of the reflector, while metal ring 80 reflects the radiation. Moreover, to increase the radiation reflection, the housing cavity confining the LED and rod 32 may be metal-coated. Infrared multidirectional beams of light are transmitted radially perpendicularly to the pen axis.

Moreover, internal infrared transmitter provides a good uniformity of the light transmission over the 360 degrees angular communications range around the pen longitudinal axis. FIG. 14A illustrates a typical profile of the intensity of transmitted infrared signal as a function of direction. Device 300 emits infrared signals propagating as shown in FIG. 14A with radiation lobs (81). For example 10% of energy is radiating in 45 degrees (83).

It will be appreciated by one ordinarily skilled in the art that other features of the prior art pen devices described hereinabove and novel features of the pen devices according to the various aspects of the present invention as filer described herein can be combined to operate with device 300.

Improved Mouse System

According to another aspect, the present invention provides a pen device including an improved cap having functional features of a computer mouse. The pen device according to this aspect of the present invention is shown in FIG. 15 and is referred to herein below as device 400.

Turning now to FIG. 15, a pen device having an improved cap, generally designated 92, will be described. The pen operates in two modes of operations—"digital pen mode" for tracking pen strokes, and a "mouse mode" where the digital pen may serve as a mouse for the host device. Generally, when a user desires to switch from a conventional digitizer pen, using ink on a writing surface, to a computer mouse, and moves the mouse to track the cursor, the movements of the pen are marked on the surface. One embodiment of the present invention discloses a plastic cap to be placed over the tip of the pen, enabling the refill to switch on/off when touching the surface. This cap is used normally as a pen cap to cover the writing implement and to avoid liking of the ink when not in use, and may be designed to fit the other side of the pen when in use. When the pen would function as a mouse, the cap prevents the refill to draw on the surface. When the pen would function as a conventional pen, the cap would be simply removed and may be placed at the other side of the pen.

The improved mouse-cap provided by some embodiments of the present invention allows pen device 400 to be used as both a digitizer pen, or alternatively, as a traditional mouse pointer device, For instance, a removable cap 92 with a cap end structured to cover writing tip 98 when not in use may also be operated in a manner similar to a conventional mouse. Cap 92 includes at least one slot 99 or a transparent layer, especially adapted to convey signals from pen device 400 to a receiver; a protruding element 94 peripherally extended out of cap 92 pressing on writing tip 98 for preventing the marking of the surface or 'muzzling' writing tip 98, when pen device 400 is used as a mouse. The term "peripherally" refers hereinafter to the circumference of the cap, The term "protruding movable element" refers hereinafter to tool having a bulged shape such as a ball, selected in a non-limiting manner from the group consisting of a roller, a knob, and a button.

Pen device 400 may include at least one pressing button 96 embedded in cap 92, or in pen device body 90, especially adapted to perform the functions of the standard mouse "click" buttons. When the mouse is in use, pressing button 96 can activate one or more switches embedded in the pen device body 90. Pressing buttons 96 having an outer protrusion portion and an inner protrusion portion are configured such that inner protrusions portion are positioned above pen device switches (not shown). Pen device 400 transmits ultrasound and infrared signals, even when cap 92 is mounted on pen device 400 through slots 99 or, transparent layer. Cap 92 and pressing buttons 96 can be formed of plastic selected in a non-limiting manner from polymeric materials such as polyethylene and polystyrene or epoxy, silicone, and polyurethane that have the capability of being molded or shaped, usually by the application of heat and pressure.

According to another embodiment of the present invention, cap 92 may also integrates an eraser.

According to another embodiment of the present invention, pen device 400 also includes a software system including an electronic circuitry operative to detect the covering of writing tip 98 by cap 92 and hence to determine if the pen is in a pen mode or in a mouse mode.

It will be appreciated by one ordinarily skilled in the art that other features of the prior art pen devices described hereinabove and novel features of the pen devices according to the various aspects of the present invention as further described herein can be combined to operate with device 400.

Another potential advantage provided by some embodiments of the present invention is that the operative tip 38 is as close as possible to the point of transmission and only small tilt effect can occur. The term "tilt effect" refers hereinafter to the phenomenon, in which the position of the operative tip is different from the point of transmission located above it, leading to inaccurate location position information of the tip. Moreover, in conventional prior art devices, the users may position their fingers over the region of the infrared or ultrasound transducers, located close to the writing tip, thereby blocking communication between the electronic pen and a base unit. In contrast, in device 100, the emission of signals 37 in axis 15 direction, facilitates the finger holding of pen device 100, which can be close to the operative tip, without involving a risk of blocking the transmission of emitted signals 37.

All references cited herein are incorporated by reference in their entirety Citation of a reference does not constitute an admission that the reference is prior art.

The present invention has been described using detailed descriptions of embodiments thereof that are provided by way of example and are not intended to limit the scope of the invention The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. An electronic pen device comprising:
   a. an elongated housing including an elongated inner cavity that includes a proximal narrow portion whose average radius is a first value and a distal wider portion whose average radius is a second value greater than said first value, thereby providing said housing with a distal opening whose radius is substantially equal to said second value, said housing further including at least one radial bore located at the distal end of said housing and emerging from said distal wider portion of said inner cavity; and
   b. at least one ultrasound transmitter comprising piezoelectric film deployed on said housing such that at least a portion of said piezoelectric film overlays at least one said radial bore.

2. The pen device according to claim 1, wherein said pen is configured so that a majority of sound energy of sound waves generated by said piezoelectric film:
   i) enters into said elongated inner cavity via said at least one radial bore;
   ii) is downwardly transmitted within said elongated inner cavity towards a distal end of said housing;
   iii) exits said housing at a distal end.

3. The pen device according to claim 1 wherein said pen further comprises:
   c. a sound-reflecting external cover overlaying said piezoelectric film, said cover being configured to re-direct propagation of external sound waves downward radially outwardly.

4. The pen device of claim 3 wherein said pen device is configured such that such a majority of externally-propagating sound waves generated by said piezoelectric film is confined by said sound-reflecting external cover to propagate substantially a downward direction.

5. The pen device according to claim 3, wherein said cover is connected to said housing at a proximal end of said cover and the distal end is open to facilitate downward external propagation of sound waves.

6. The pen device according to claim 3, wherein said cover is made of any solid material substantially blocking propagation of ultrasonic waveform incident onto said cover.

7. The pen device according to claim 3, wherein said solid material is selected from the group consisting of plastic, metal, wood and other solid material.

8. The pen device according to claim 1, further comprising:
   d. an elongated rod positioned within said cavity.

9. The pen device according to claim 8, wherein said rod has its operative tip extending from the housing extremity to function as a writing tip of the pen device.

10. The pen device according to claim 8, wherein said rod is selected from the group consisting of a refill, a pencil tip, a marker, a plastic stylus, and an eraser.

11. The pen device according to claim 8, wherein said rod is removably inserted within said housing.

12. The pen device according to claim 8, wherein said rod is movable longitudinally along the pen axis.

13. The pen device according to claim 1, further comprising:
   e. at least one optical element selected from the group consisting of an infrared transmitter and an infrared receiver for facilitating determination of a location of the pen device using ultrasound signals handled by said at least one ultrasound transducer and infrared signals handled by said at least one optical element.

14. The pen device according to claim 13, wherein said infrared transmitter is positioned within said elongated cavity.

15. The pen device according to claim 1, wherein said inner cavity is dimensioned to form a resonance volume, sized to be in resonance with a transmitter resonance frequency of said ultrasound transmitter.

16. The pen device according to claim 1, wherein said piezoelectric film is formed from at least one material selected from the group consisting of polarized fluoropolymer, polyvinylidene fluoride (PVDF), polyvinylidene difluoride and its copolymers.

17. The pen device according to claim 1, wherein said piezoelectric film is wrapped around an external surface of said housing.

18. the pen device according to claim 1, wherein said at least portion of said piezoelectric film is radially outward from said at least one radial bore that said piezoelectric film overlays.

* * * * *